US009287787B2

(12) United States Patent
Gaknoki et al.

(10) Patent No.: US 9,287,787 B2
(45) Date of Patent: Mar. 15, 2016

(54) ON TIME SAMPLING PREVENTION

(71) Applicant: Power Integrations, Inc., San Jose, CA (US)

(72) Inventors: Yury Gaknoki, San Jose, CA (US); David Kung, Foster City, CA (US); Michael Yue Zhang, Mountain View, CA (US)

(73) Assignee: Power Integrations, Inc., San Jose, CA (US)

( * ) Notice: Subject to any disclaimer, the term of this patent is extended or adjusted under 35 U.S.C. 154(b) by 49 days.

(21) Appl. No.: 14/335,637

(22) Filed: Jul. 18, 2014

(65) Prior Publication Data
US 2014/0328089 A1    Nov. 6, 2014

Related U.S. Application Data

(63) Continuation of application No. 13/248,786, filed on Sep. 29, 2011, now Pat. No. 8,797,769.

(51) Int. Cl.
*H02M 3/335* (2006.01)
*H02M 1/08* (2006.01)
*H02M 1/00* (2007.01)

(52) U.S. Cl.
CPC ............ *H02M 3/33515* (2013.01); *H02M 1/08* (2013.01); *H02M 3/33523* (2013.01); *H02M 2001/0025* (2013.01)

(58) Field of Classification Search
CPC . H02M 3/338; H02M 3/335; H02M 3/33523; H02M 3/33507
USPC ............... 363/18, 21.04, 21.05, 21.07, 21.08, 363/21.09, 21.1, 21.11, 21.12, 21.13, 21.15, 363/21.16, 21.17, 21.18
See application file for complete search history.

(56) References Cited

U.S. PATENT DOCUMENTS

| 4,809,150 A | 2/1989 | Limuti et al. |
| 5,901,051 A | 5/1999 | Takahashi et al. |

(Continued)

FOREIGN PATENT DOCUMENTS

| CN | 1264269 A | 8/2000 |
| CN | 2911700 Y | 6/2007 |

(Continued)

OTHER PUBLICATIONS

KR 10-2012-107426—Korean Third Office Action with English Translation, issued Dec. 26, 2014 (8 pages).

(Continued)

*Primary Examiner* — Nguyen Tran
(74) *Attorney, Agent, or Firm* — Blakely Sokoloff Taylor & Zafman LLP

(57) ABSTRACT

An example controller circuit includes a feedback sampling circuit, an oscillator, a drive logic, and a false sampling prevention circuit. The feedback sampling circuit generates a sample signal in response to a sampling of a feedback signal. The oscillator generates an on-time signal that transitions from a first logic state to a second logic state during each period of the on-time signal. The drive logic controls a switch to regulate the output of a power converter. The drive logic turns on the switch to end an off-time of the switch in response to the on-time signal transitioning from the first logic state to the second logic state. The false sampling prevention circuit prevents the on-time signal from transitioning from the first logic state to the second logic state to extend the off-time of the switch until a sampling complete signal indicates that sampling of the feedback signal is complete.

14 Claims, 12 Drawing Sheets

(56) References Cited

U.S. PATENT DOCUMENTS

| | | | |
|---|---|---|---|
| 6,118,675 A * | 9/2000 | Lionetto | H02M 1/36 363/21.13 |
| 7,253,997 B2 * | 8/2007 | Balakrishnan | H02M 3/33507 361/18 |
| 7,561,447 B2 | 7/2009 | Yang et al. | |
| 2011/0090718 A1 | 4/2011 | Morota | |
| 2011/0194314 A1 * | 8/2011 | Morota | H02M 3/33507 363/21.15 |

FOREIGN PATENT DOCUMENTS

| | | |
|---|---|---|
| CN | 201821267 U | 5/2011 |
| EP | 0993105 A1 | 4/2000 |
| JP | 2000287442 A | 10/2000 |

OTHER PUBLICATIONS

CN 201210372103.1—Chinese Second Office Action with English Translation, issued Jan. 15, 2015 (7 pages).

TW 101135707—Taiwanese Second Office Action with English Translation, issued Jun. 23, 2015 (7 pages).

CN 201210372103.1—Chinese First Office Action and Search Report with English translation, issued Jul. 31, 2014 (15 pages).

KR 10 2012 107426 First Korean Office Action, issued Oct. 17, 2013, with English translation (6 pages).

TW 101135707—Taiwan First Office Action and Search Report with English Translation, issued Jun. 20, 2014 (10 pages).

KR 10 2012 107426—Final Korean Office Action with English Translation, issued Aug. 24, 2014 (5 pages).

* cited by examiner

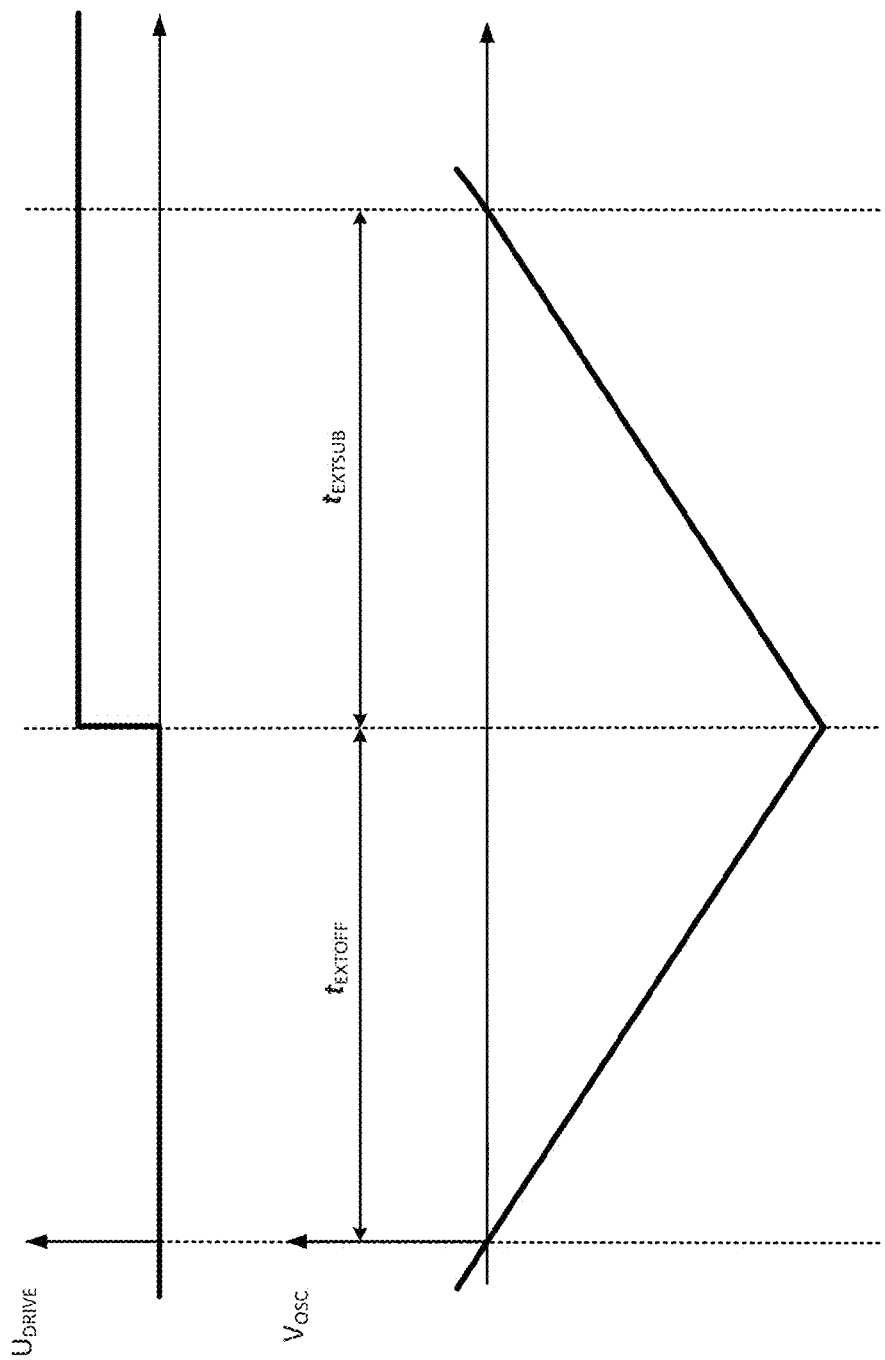

ON TIME SAMPLING PREVENTION

REFERENCE TO PRIOR APPLICATION(S)

This is a continuation of U.S. application Ser. No. 13/248,786, filed Sep. 29, 2011, now pending. U.S. application Ser. No. 13/248,786 is hereby incorporated by reference.

BACKGROUND INFORMATION

1. Field of the Disclosure

The present invention relates generally to power converter controllers, and more specifically, the invention relates to power converter controllers that are used for primary side regulation.

2. Background

Many electrical devices such as cell phones, personal digital assistants (PDA's), laptops, etc. utilize power to operate. Because power is generally delivered through a wall socket as high voltage alternating current (ac), a device, typically referred to as a power converter can be utilized to transform the high voltage alternating current (ac) input to a well regulated direct current (dc) output through an energy transfer element. Switched mode power converters are commonly used to improve efficiency, size, and reduce component count in many of today's electronics. A switch mode power converter may use a power switch that switches between a closed position (ON state) and an open position (OFF state) to transfer energy from an input to an output of the power converter. In operation, a power converter may use a controller to provide a regulated output to an electrical device (generally referred to as a load) by sensing and controlling the output voltage and/or current of the power converter in a closed loop. A switching cycle may be defined by the switching frequency of the power switch. In one example, the duration of a switching cycle includes the power switch transitioning to an ON state followed by a time the switch transitions to an OFF state. The controller may be coupled to receive feedback information about the output of the power converter in order to regulate the output quantity delivered to the load. The controller regulates the output quantity delivered to the load by controlling the power switch to turn on and off in response to the feedback information to transfer energy pulses to the power converter output from a source of input power such as a power line.

For certain applications, a power converter may be required to provide galvanic isolation. Specifically, galvanic isolation prevents dc current from flowing between the input side and the output side of the power converter, and is usually required to meet safety regulations. One particular type of power converter that uses galvanic isolation is a flyback power converter.

One type of control method for galvanic isolated power converters is primary side control. Specifically, primary side control is when the controller uses a sensing element that is electrically isolated from the secondary side of the power converter. One type of primary side regulation may use an additional winding (e.g., a bias winding) that is electrically coupled to the input side and receives information from the output side through magnetic coupling. In one example, a bias winding may be used to sense an output voltage of a flyback power converter.

A power converter may be suitable to operate in two modes of operation. In a first mode of operation, known as discontinuous conduction mode, all the energy stored in the energy transfer element is transferred to the output during the OFF state of the power switch. In this mode of operation, there is a limited amount of time after the power switch is closed (in an OFF state) that bias winding voltage may represent the output voltage of the power converter. In a second mode of operation, known as continuous conduction mode, only a portion of the energy stored in the energy transfer element is transferred to the output during the OFF state of the power switch. In this mode of operation, the bias winding voltage may represent the output voltage for substantially the entire time the power switch is closed (in an OFF state). Even though the bias winding voltage may be representative of the output voltage for substantially the entire off time (time when power switch is in an OFF state) during continuous conduction mode, the duration of time that the bias winding voltage is representative of the output voltage is still shorter than when the controller is operating in a discontinuous conduction mode. This may occur, because the duration of the off time of the power switch in discontinuous conduction mode is long enough for all energy to be transferred to the output of the power converter; whereas the off time of the power switch in continuous conduction mode is truncated (to start the next switching cycle) before all energy is delivered to the output of the power converter. Therefore, when the controller is operating in continuous conduction mode, there is less time to acquire a sample of the bias winding voltage that is representative of an output voltage.

Furthermore, there may be switching noise coupled to the bias winding during the time the bias winding voltage is representative of the output voltage that even further reduces the window of time for the controller to capture a relatively 'clean' (without noise) signal from the bias winding that is representative of the output voltage of the power converter. Even still, under certain loading conditions (e.g high load demand), power converters may be required to increase power delivery by increase the switching frequency which further shortens the duration of time power switch is in an OFF state for each switching cycle. As a result, the sampling window for acquiring a clean signal is further reduced.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 8 illustrates an exploded view of the oscillator voltage and sampling complete signal waveforms of FIG. 7B.

DETAILED DESCRIPTION

Figure 1:
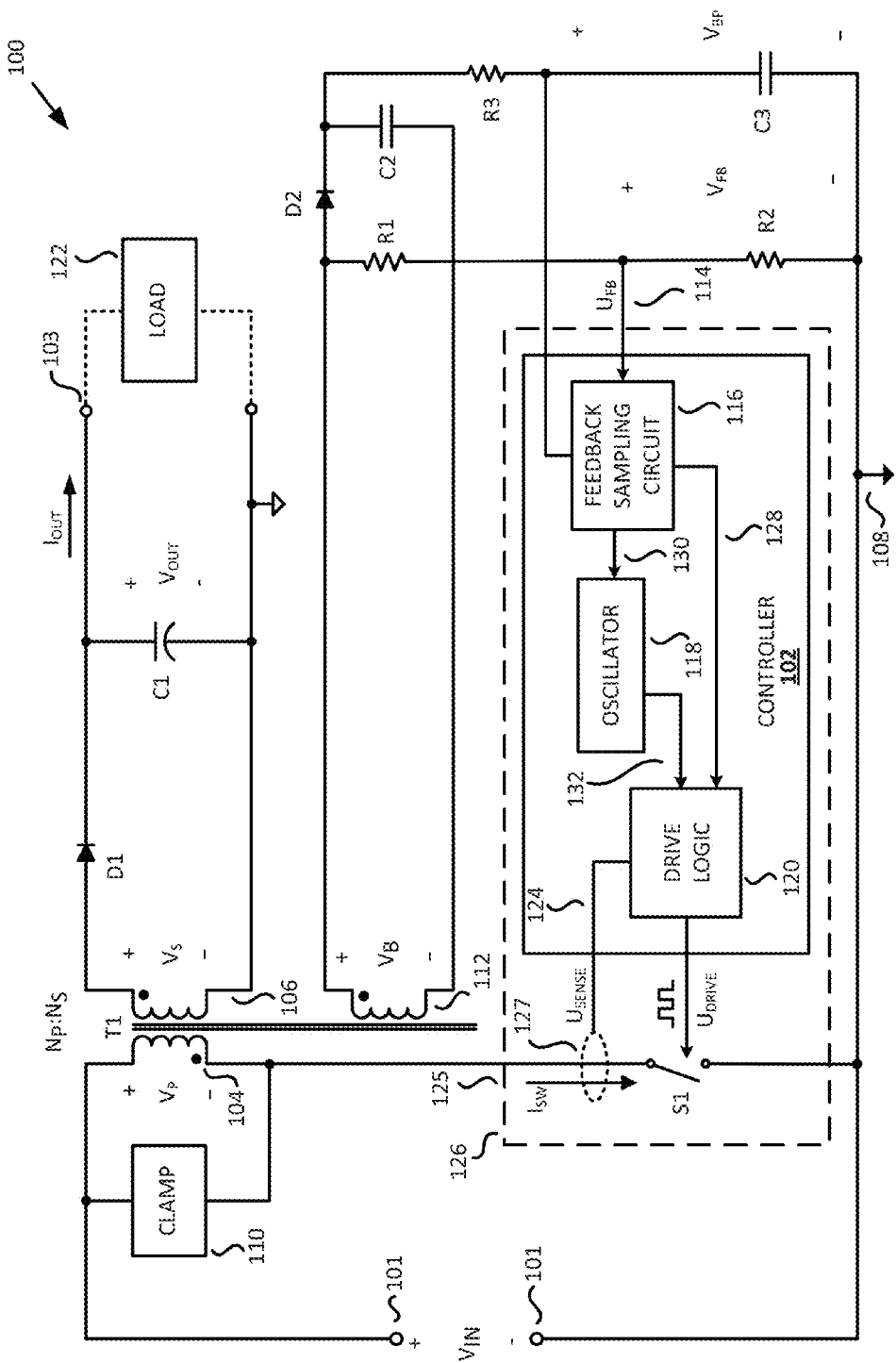
FIG. 1 is a functional block diagram illustrating an example power converter including a controller, in accordance with the teachings of the present invention.

Examples related to false sampling prevention in power converter controllers are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, example integrated controllers for power converters provide output regulation by sensing and controlling the output of the power converter in a closed loop. In power converters that utilize primary side control, the power converter may rely on magnetic coupling between isolated windings of an energy transfer element to provide a feedback signal that is representative of the output voltage. For example, the energy transfer element may be a coupled inductor that includes an output winding and a bias winding magnetically coupled together to provide a feedback signal to the controller that is representative of an output voltage of the power converter.

When using a bias winding for sensing the output voltage in a fly back power converter topology, the bias winding may be representative of the output voltage during the time energy is being transferred to the output while the power switch is in an OFF state. In operation, the controller may use a sampling circuit that includes a capacitor to capture a bias winding voltage when it is representative of the output voltage. The sampled signal may be stored on the capacitor and may then be used by drive logic of the controller to control the power switch.

Since, there is a limited amount of time that the power switch is in the OFF state, the controller may be designed to sample the bias winding voltage during a specified window of time. The window of time may be further reduced depending on the mode in which the power converter is operating in.

Specifically, a power converter may be suitable to operate in two modes of operation. In a first mode of operation, known as discontinuous conduction mode, all the energy stored in the energy transfer element is transferred to the output during the OFF state of the power switch. In this mode of operation, there is a limited amount of time (duration of time it takes for energy to be transferred to output) after the power switch is closed (in an OFF state) that bias winding voltage may represent the output voltage of the power converter. In a second mode of operation, known as continuous conduction mode, only a portion of the energy stored in the energy transfer element is transferred to the output during the OFF state of the power switch. In this mode of operation, the bias winding voltage may represent the output voltage for substantially the entire time the power switch is closed (in an OFF state). Even though the bias winding voltage may be representative of the output voltage for a portion of the off time (time when power switch is in an OFF state) during operation in discontinuous conduction mode, the duration of time that the bias winding voltage is representative of the output voltage is still longer than when the controller is operating in a continuous conduction mode. This may occur, because the bias winding is representative of the output voltage only during the time energy is being transferred to the output of the power converter. Since the off time of the power switch in continuous conduction mode of operation is truncated (to start the next switching cycle) before all energy is delivered to the output of the power converter, there is a shorter duration of time that the bias winding is representative of an output voltage. Therefore, when the controller is operating in continuous conduction mode, there is even less time to acquire a sample of the bias winding voltage that is representative of an output voltage then when operating in discontinuous conduction mode.

In addition, the switching noise that is initially present on the bias winding when the power switch switches to the OFF state, must also be considered. For example, the controller may need to delay sampling before acquiring a relatively clean bias voltage sample. This sampling delay further reduces the window of time to sample the bias winding voltage while it is representative of the output voltage. Furthermore, when the switching frequency of the power switch increases (typically during greater loading of the output) the amount of time to sample the bias winding voltage during the OFF time of each switching period becomes shorter. Thus, under some conditions (e.g., discontinuous conduction mode, low input voltage, and high load condition) the controller may be forced to sample just before the power switch is to turn on for the next switching cycle. For conventional controllers, the controller may be forced to or accidently sample after the power switch has already turned on (i.e., when the power switch transitions from OFF state to ON state) resulting in a false sampling. For example, in one controller design the minimum offtime of the power switch may be 2.5 µs and the sample delay time (time at which the controller may begin sampling after the power switch turns off) may also be 2.5 µs. Thus, in a scenario where the controller is operating with the minimum off time, the sampling may occur after the switch has switched to an ON state. Thus, the controller may receive a sample of the bias winding voltage that is not representative of the output voltage. Accordingly, embodiments of the present invention include a controller for a power converter that allows for this type of overlapping of timing (e.g., sample delay time minimum off time) by preventing the sampling of the feedback signal during the ON time of the power switch. In one example, this overlapping of time where the power converter is operating at minimum OFF time and has a large sample delay time, may arise only for a brief duration and under a certain set of circumstances, such as, during a transient load condition when operating in continuous conduction mode and using low input voltage in a high load condition.

In another scenario, sampling by conventional controllers during the ON time may accidently occur even if there is no intentional overlapping between the sampling delay time and the minimum off time of the power switch. For example, due to individual component or timing variations internal to the controller, the power controller may miss sampling during the OFF state and may inadvertently sample during the subsequent ON state thus acquiring a false sample. The sampling of the feedback signal when it is sampled during the ON state may be referred to herein as a "false sampling." Accordingly, embodiments of the present invention utilize a false sampling prevention circuit included in the controller to reduce the occurrence of false samplings when the power switch is in an ON state. In one example, the false sampling prevention circuit extends the OFF state of the power switch until the sampling of the feedback signal is complete. In other words, the turning on of the power switch to begin the next switching cycle is delayed until the sampling of the bias winding voltage is complete. This and other embodiments will be discussed in more detail below.

FIG. 1 is a functional block diagram illustrating an example power converter 100 including a controller 102, in accordance with the teachings of the present invention. The illustrated example of power converter 100 includes an input (i.e., input terminals 101), controller 102, and output (i.e., output terminals 103), an energy transfer element T1, a primary winding 104 of the energy transfer element T1, a secondary winding 106 of the energy transfer element T1, a power switch S1, an input return 108, a clamp circuit 110, a rectifier D1, an output capacitor C1, a bias winding 112, resistors R1, R2, and R3, and capacitors C2 and C3. Controller 102 is shown as being included in integrated circuit 126 that includes a feedback terminal 114. Controller 102 includes a feedback sampling circuit 116, an oscillator 118, and drive logic 120. Also shown in FIG. 1 are an input voltage $V_{IN}$, an output voltage $V_{OUT}$, an output current $I_{OUT}$, a feedback voltage $V_{FB}$, a bypass voltage $V_{BP}$, a feedback signal $U_{FB}$, a drive signal $U_{DRIVE}$, and a switch current $I_{SW}$. In the illustrated example, power converter 100 is shown as a power converter having a flyback topology for explanation purposes. It is appreciated that other known topologies and configurations of power converter may also benefit from the teachings of the present invention.

In one embodiment, power converter 100 provides output power to a load 122 from an unregulated dc input $V_{IN}$. For example, input $V_{IN}$ may originate from a rectified and filtered ac line voltage. As shown, energy transfer element T1 is coupled to receive input $V_{IN}$. In some embodiments, energy transfer element T1 is a coupled inductor. In some other embodiments, energy transfer element T1 is a transformer. In the example of FIG. 1, the energy transfer element T1 includes primary winding 104 and secondary winding 106. NP and NS are the number of turns for the primary winding 104 and secondary winding 106, respectively. In the example of FIG. 1, primary winding 104 may be referred to as an input winding, and secondary winding 106 may be referred to as an output winding. As shown, primary side winding 104 is electrically coupled to input return 108 and secondary winding 106 is electrically coupled to an output return 109. In one example, circuitry electrically coupled to input return 108 may be referred to being on the 'input side' of power converter 100 and circuitry electrically coupled to the output return 109 may be referred to being on the 'output' side of power converter 100. As shown, primary winding 104 is further coupled to power switch S1, which is then further coupled to the input return 108. In addition, clamp circuit 110 is coupled across primary winding 104 of the energy transfer element T1 to limit a voltage drop across primary winding 104.

Secondary winding 106 of the energy transfer element T1 is coupled to the output rectifier D1. In the example illustrated in FIG. 1, rectifier D1 includes an output diode and the secondary winding 106 is coupled to the anode of output diode D1. However, in some embodiments the rectifier D1 may be a transistor used as a synchronous rectifier. Both the output capacitor C1 and the load 122 are coupled to the rectifier D1. In the example of FIG. 1, both the output capacitor C1 and the load 122 are coupled to the cathode of the rectifier D1. Power converter 100 provides a regulated output at output terminals 103 to load 122 that may be an output voltage $V_{OUT}$, an output current $I_{OUT}$, or a combination of the two.

In the example of FIG. 1, input voltage $V_{IN}$ is positive with respect to input return 108. The example of FIG. 1 further shows galvanic isolation between the input return 108 and the output of power converter 100. In other words, there is no direct path for DC current between input return 108 and the output of power converter 100. Therefore, the input side of the power converter 100 is galvanically isolated from the output side of power converter 100.

In the illustrated embodiment, feedback terminal 114 is coupled to receive feedback signal $U_{FB}$. Resistors R1 and R2 are coupled to bias winding 112 to scale the bias winding voltage $V_{BIAS}$ down to provide the feedback voltage $V_{FB}$. In the example shown, the voltage across resistor R2 (i.e., the feedback voltage $V_{FB}$) is utilized as the feedback signal $U_{FB}$. The feedback voltage $V_{FB}$ is received by the controller 102 via terminal 114 and further, by the feedback sampling circuit 116 (discussed in more detail below).

As shown, integrated circuit 126 may include terminals in addition to feedback terminal 114. For example, integrated circuit 126 may include a drain terminal 125 for receiving a drain voltage. A current sense 127, included in integrated circuit 126, may provide a current sense signal $U_{ISENSE}$ 124 to controller 102 that is representative of a switch current $I_{SW}$. In addition, the controller 102 provides drive signal $U_{DRIVE}$ to power switch S1 to control various switching parameters. Examples of such parameters may include switching frequency, switching period, duty cycle, or respective on and off times of power switch S1.

In some embodiments, power switch S1 may be a transistor and the controller 102 may include passive and/or discrete electrical components. In one embodiment, controller 102 and power switch S1 are included together into a single integrated circuit 126. In one example, integrated circuit 126 is a monolithic integrated circuit. In another example, integrated circuit 126 is a hybrid integrated circuit.

As illustrated in FIG. 1, the controller 102 includes feedback sampling circuit 116 that is coupled to receive the feedback signal $U_{FB}$. In operation, feedback sampling circuit 116 samples feedback signal $U_{FB}$ and provides a sample signal $U_{SAMPLE}$ 128 that is representative of the feedback signal $U_{FB}$. Sample signal $U_{SAMPLE}$ 128 is then received by drive logic 120. Drive logic 120 further receives current sense signal $U_{ISENSE}$ 124 and outputs drive signal $U_{DRIVE}$ in response to the sample signal $U_{SAMPLE}$ 128 and in response to the on-time signal $U_{ON}$ 132 generated by oscillator 118. In some embodiments, drive logic 120 also outputs drive signal $U_{DRIVE}$ in response to the current sense signal $U_{ISENSE}$ 124.

Switching power switch S1 between an ON state and an OFF state produces a time varying voltage $V_P$ across the primary winding 104. Energy transfer element T1 produces a scaled replica, the scale factor being the ratio that is the number of turns $N_S$ of secondary winding 106 divided by the number of turns NP of primary winding 104, of primary voltage $V_P$ across the secondary winding 106 during the ON state of power switch S1. The switching of power switch S1 also produces a pulsating current at the rectifier D1. The current in rectifier D1 is filtered by output capacitor C1 to produce a substantially constant output voltage Vout, output current $I_{OUT}$, or a combination of the two at output terminals 103.

During operation, bias winding 112 produces bias winding voltage $V_{BIAS}$ that is responsive to the output voltage $V_{OUT}$ when rectifier D1 conducts. Feedback voltage $V_{FB}$ and therefore feedback signal $U_{FB}$ are representative of the output voltage $V_{OUT}$ during at least a portion of an OFF time of power switch S1. In one embodiment, when controller 102 is operating in discontinuous conduction mode, feedback signal $U_{FB}$ is representative of the output voltage $V_{OUT}$ only during the portion of the OFF time. Discontinuous conduction mode may be defined as when the energy in energy transfer element T1 is reduced to substantially zero during the OFF state of the power switch. In other words, during a discontinuous conduction mode of operation rectifier D1 conducts for only a portion of time that power switch S1 is in an OFF state. In another example, feedback signal $U_{FB}$ is representative of output voltage $V_{OUT}$ during the entire portion of the OFF time. In another embodiment, when controller 102 is operating in continuous conduction mode, feedback signal $U_{FB}$ is representative of the output voltage $V_{OUT}$ for substantially the entire time power switch S1 is in an OFF state. Continuous conduction mode may be defined as when the energy in energy transfer element T1 is not substantially reduced to zero during the OFF state of the power switch. In other words, during a continuous conduction mode of operation, rectifier D1 conducts for the entire duration that power switch S1 is in an OFF state.

In one example, bias winding $V_{BIAS}$ 112 may also provide a source of power to for controller 102. In particular, diode D2, capacitors C2 and C3, and resistor R3 produce a dc supply voltage (i.e., bypass voltage VBP) that is provided to power controller 102. As shown, controller 102 is coupled to receive by pass voltage $V_{BP}$ through bypass terminal 143.

Use of bias winding 112 to sense output voltage $V_{OUT}$ provides galvanic isolation between the output voltage $V_{OUT}$ and the controller 102 without the expense of an optocoupler. However, when using a winding of energy transfer element T1 to sense output voltage $V_{OUT}$, bias winding voltage $V_{BIAS}$ at bias winding 112 may be representative of output voltage $V_{OUT}$ only when output rectifier D1 is conducting. Thus, the feedback sampling circuit 116 may only sample the feedback signal $U_{FB}$ during the OFF state of power switch S1. Furthermore, when the switching frequency of power switch S1 is high (corresponding to shorter switching OFF states in a switching period), there is less time that the feedback signal $U_{FB}$ is representative of output voltage $V_{OUT}$.

Figure 2:
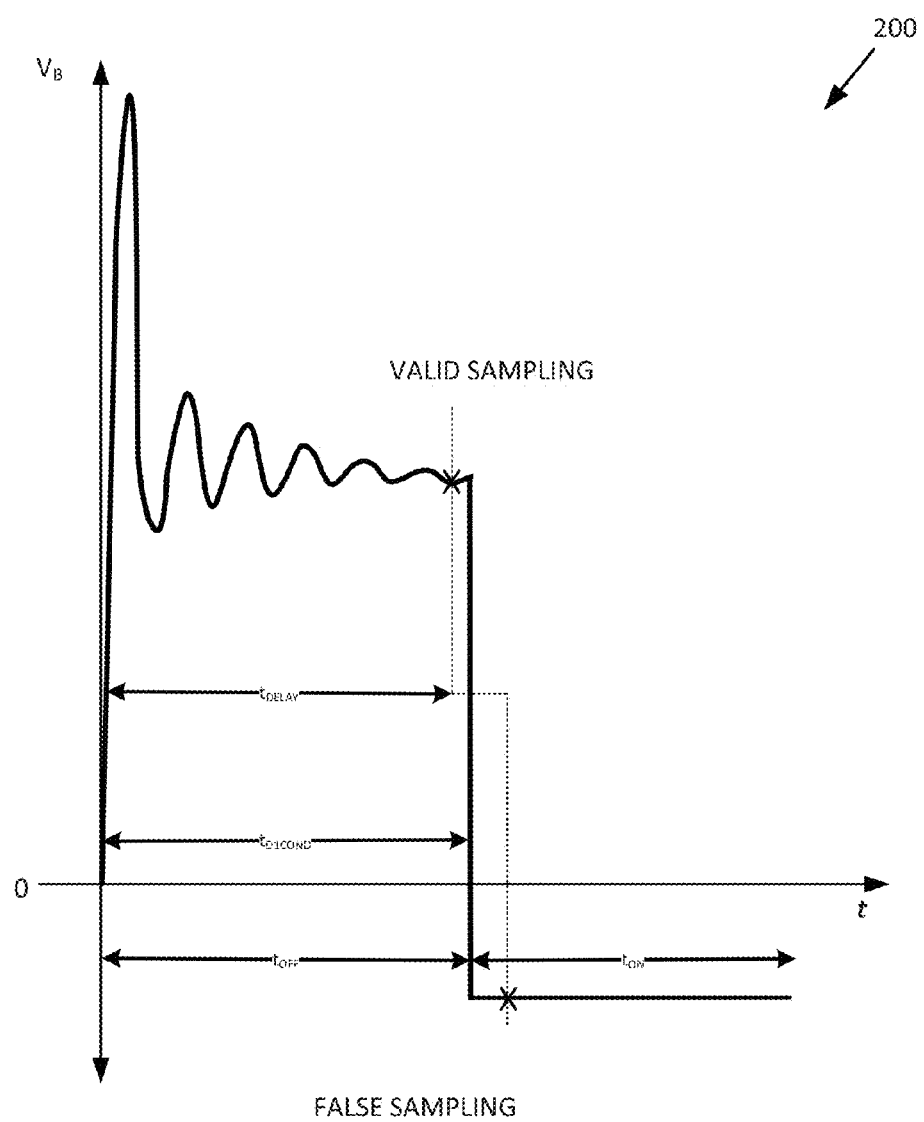
FIG. 2 illustrates an example voltage waveform of the bias winding of the power converter of FIG. 1.

FIG. 2 illustrates an example voltage waveform of the bias winding voltage $V_{BIAS}$ when power converter 100 of FIG. 1 is operating in continuous conduction mode. As shown in FIG. 2, voltage $V_{BIAS}$ is representative of the output voltage $V_{OUT}$ during an off time $t_{OFF}$ of each switching cycle. During an heavy load condition, when power converter 100 is already operating in continuous conduction mode, the switching frequency may increase thus reducing the OFF time $t_{OFF}$ of each switching period. As such, there is also less time to sense the output voltage $V_{OUT}$ when power converter 100 is operating in continuous conduction mode. Furthermore, the sampling of the feedback signal $U_{FB}$ may be delayed towards the end of the off time $t_{OFF}$, in part, to ensure a more accurate representation of output voltage $V_{OUT}$ is sampled to allow ringing noise in the bias winding voltage $V_{BIAS}$ to subside. Thus, feedback sampling circuit 116 of FIG. 1, may sample the feedback signal $U_{FB}$ at a sample delay time $T_{DELAY}$ after power switch S1 turns off. However, due to specific operating conditions and/or individual components or other parameter variations in power converters or within a controller itself, conventional circuits may sample the feedback signal $U_{FB}$ at an incorrect time.

By way of example, FIG. 2 illustrates a valid sampling of the feedback signal $U_{FB}$ that occurs toward the end of the off time $t_{OFF}$, when a majority of the ringing in the bias winding voltage has subsided. However, component mismatches and/or a transient event at the load may cause conventional circuits to falsely sample the feedback signal $U_{FB}$ after power switch S1 has already turned on in the subsequent switching cycle. In one embodiment, the bias winding voltage $V_{BIAS}$, is representative of input voltage $V_{IN}$ during the on time TON. Thus, a false sample by a sampling circuit within the controller may provide invalid information causing improper regulation.

Accordingly, embodiments of the present invention include a power converter controller (e.g., controller 102 of FIG. 1) that includes a false sampling prevention circuit to prevent the occurrence of false samplings (e.g., to prevent samplings during the ON time of power switch S1). In one embodiment, the false sampling prevention circuit extends the off time $t_{OFF}$ of the power switch until the sampling of the feedback signal by the feedback sampling circuit 116 is complete. By extending the off time $t_{OFF}$ until sampling is complete, controller 102 can ensure that the sample by the feedback sampling circuit was completed before the bias winding voltage VB has changed. Delaying the ON time until the sampling circuit 116 has acquired an accurate sample, may change the effective switching frequency for a brief time period that will be discussed in further detail below.

Figure 3:
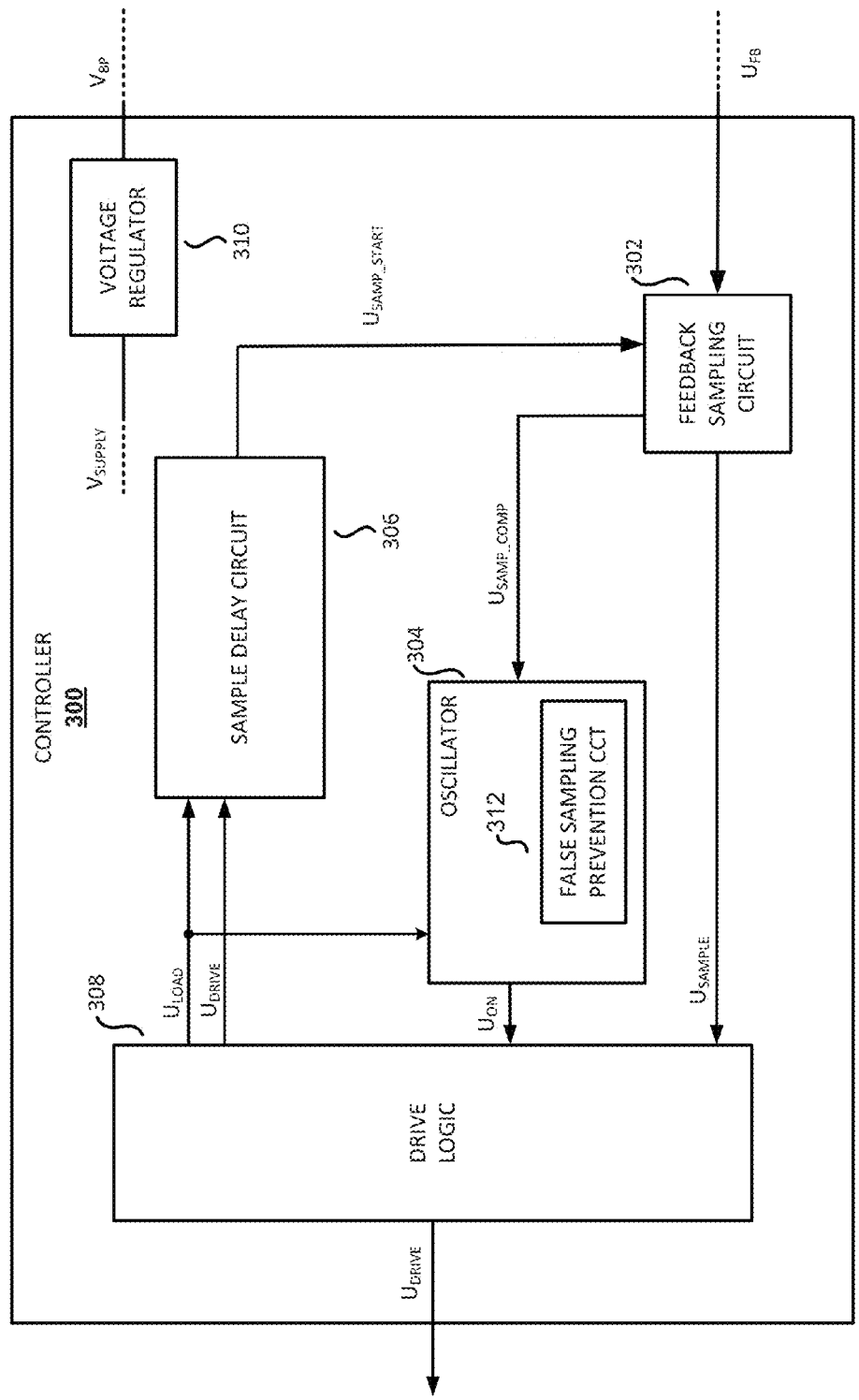
FIG. 3 is a functional block diagram illustrating an example controller, in accordance with the teachings of the present invention.

FIG. 3 is a functional block diagram illustrating an example controller 300, in accordance with the teachings of the present invention. Controller 300 is one possible implementation of controller 102 of FIG. 1. The illustrated example of controller 300 includes a feedback sampling circuit 302, an oscillator 304, a sample delay circuit 306, drive logic 308, and a voltage regulator 310. Oscillator 304 is shown as including a false sampling prevention circuit 312. Also shown in FIG. 3 is a bypass voltage $V_{BP}$, a supply voltage $V_{SUPPLY}$, a feedback signal $U_{FB}$, a sample start signal $U_{SAMP\_START}$, a sample signal $U_{SAMPLE}$, a sampling complete signal $U_{SAMP\_COMP}$, an on-time signal $U_{ON}$, a load signal $U_{LOAD}$, and a drive signal $U_{DRIVE}$.

As shown in FIG. 3, voltage regulator 310 is coupled to receive bypass voltage 310 and to provide a regulated supply voltage $V_{SUPPLY}$ to power circuits within controller 300. For example, voltage regulator 310 may be coupled to provide supply voltage $V_{SUPPLY}$ to power the feedback sampling circuit 302, the oscillator 304, the sample delay circuit 306, and/or the drive logic 308.

FIG. 3 further illustrates drive logic 308 coupled to generate the drive signal $U_{DRIVE}$. In one embodiment drive logic 308 operates using a fixed frequency pulse-width modulator (PWM) control adapted to adjust a duty cycle of power switch S1 to regulate the output of the power converter. In this embodiment, drive logic 308 is adapted to turn on power switch S1 each switching cycle responsive to the on-time signal $U_{ON}$. In operation, on-time signal $U_{ON}$ may set the switching frequency of the power switch by switching the power switch to an ON state after a set duration of time determined by a fixed frequency during steady state. Furthermore, drive logic 308 may turn off the power switch S1 to regulate the energy transferred to the output of power converter 100, each switching cycle in response a value of the sample signal $U_{SAMPLE}$. As will be discussed below, sample signal $U_{SAMPLE}$ is representative of the feedback signal $U_{FB}$, which may be representative of the output voltage of the power converter that was acquired during a portion of the off time of power switch S1. Thus, controller 300 includes an oscillator 304 and a feedback sampling circuit 302 coupled to provide drive logic 308 with the on time signal $U_{ON}$ and sample signal $U_{SAMPLE}$, respectively.

As shown in FIG. 2, the bias winding voltage $V_{BIAS}$ begins ringing immediately after the power switch S1 is turned off. Thus, controller 300 further includes sample delay circuit 306 to delay the time at which feedback sampling circuit 302 samples the feedback signal $U_{FB}$ after power switch S1 turns off. In the illustrated example of FIG. 3, sample delay generator 306 generates the sample start signal $U_{SAMP\_START}$ which begins a time delay $T_{DELAY}$ after the power switch S1 turns off. In one embodiment, the sample delay circuit 306 generates the sample start signal $U_{SAMP\_START}$ in response to the load signal $U_{LOAD}$ and in response to the drive signal $U_{DRIVE}$. By way of example, sample delay circuit 306 may pulse the sample start signal $U_{SAMP\_START}$ a time delay $T_{DELAY}$ after power switch S1 turns off as indicated by the drive signal $U_{DRIVE}$ transitioning to a logic LOW. Furthermore, the length of the time delay $T_{DELAY}$ is responsive to a load condition at the output of the power converter as indicated by the load signal $U_{LOAD}$.

In one embodiment, load signal $U_{LOAD}$ is representative of a load condition at the output of the power converter. As mentioned above, the off-time $t_{OFF}$ and the diode conduction time $T_{D1COND}$ (e.g., FIG. 2) are responsive to such load conditions.

Figure 4:
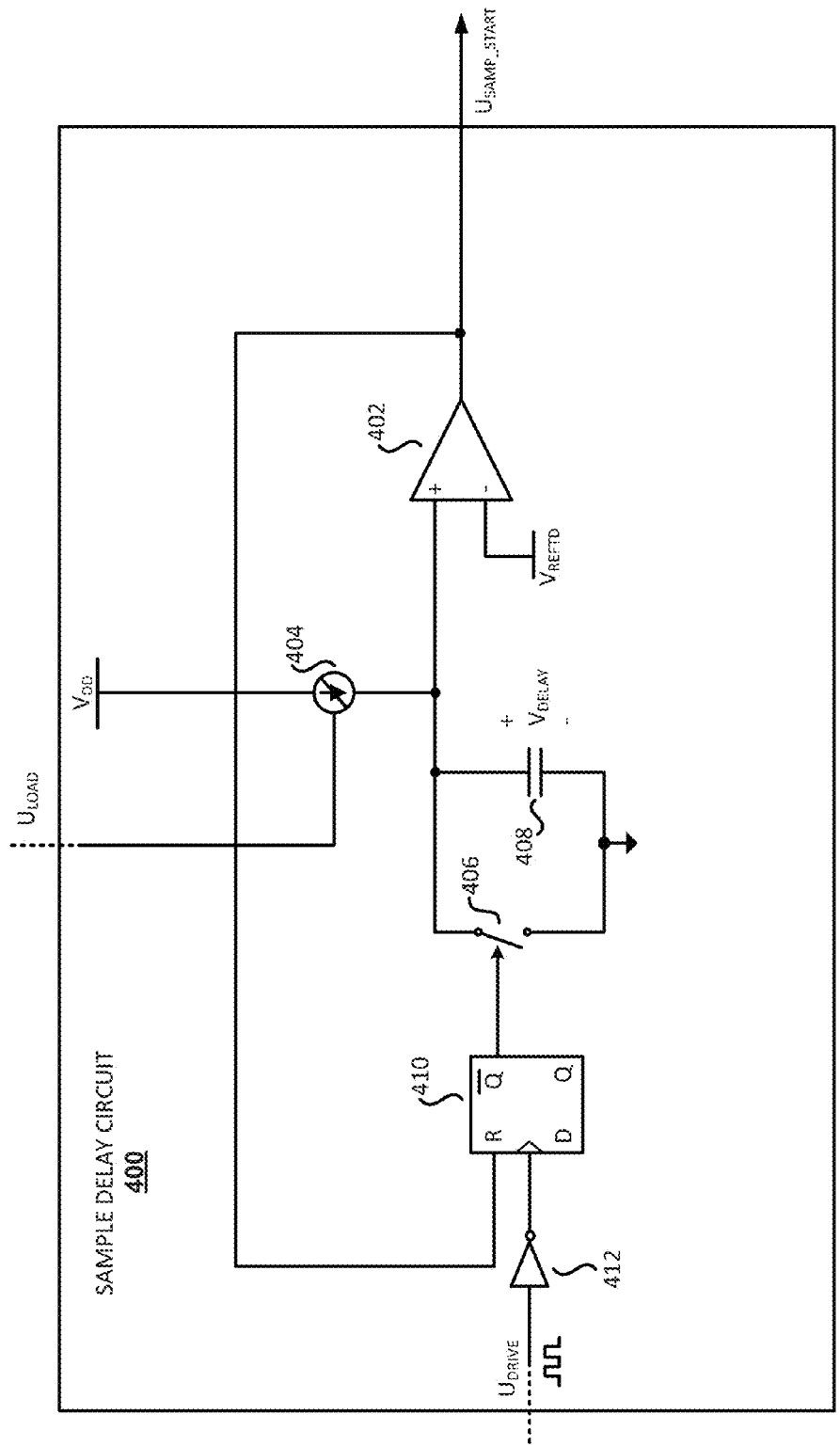
FIG. 4 is a functional block diagram illustrating an example sample delay circuit, in accordance with the teachings of the present invention.

FIG. 4 is a functional block diagram illustrating an example sample delay circuit 400, in accordance with the teachings of the present invention. Sample delay circuit 400 is one possible implementation of sample delay circuit 306 of FIG. 3. As shown in FIG. 4, sample delay circuit 400 includes a comparator 402, a variable current source 404, a switch 406, a capacitor 408, a flip-flop 410, and an inverter 412.

FIG. 4 illustrates inverter 412 as receiving the drive signal $U_{DRIVE}$ and providing an inversion of drive signal $U_{DRIVE}$ to the clock input of flip-flop 410. Thus, the $\overline{Q}$ output of flip-flop 410 transitions to a logic low when the drive signal $U_{DRIVE}$ transitions to a logic low (i.e., beginning of the off-time and when power switch S1 is turned off). Flip-flop 410 is coupled to open switch 406 when the $\overline{Q}$ output is low thereby allowing capacitor 408 to begin charging with variable current source 404. Comparator 402 is coupled to compare the voltage $V_{DELAY}$ on capacitor 408 with a reference voltage $V_{REFTD}$. When the voltage $V_{DELAY}$ on capacitor 408 reaches the reference voltage $V_{REFTD}$, the comparator 402 transitions to a logic high to reset the flip-flop 410. When flip-flop 410 is reset, the $\overline{Q}$ output of flip-flop 410 closes switch 406 thereby discharging capacitor 408. In the illustrated example, the output of comparator 402 is also coupled to generate the sample start signal $U_{SAMP\_START}$.

The magnitude of the current provided by the variable current source 404 is controlled by the load signal $U_{LOAD}$. In one embodiment, the lighter the load condition at the output of the power converter the higher the current provided by variable current source 404 in order to reduce the time delay $T_{DELAY}$ before the sample start signal $U_{SAMP\_START}$ is pulsed (beginning of sampling).

Figure 5:
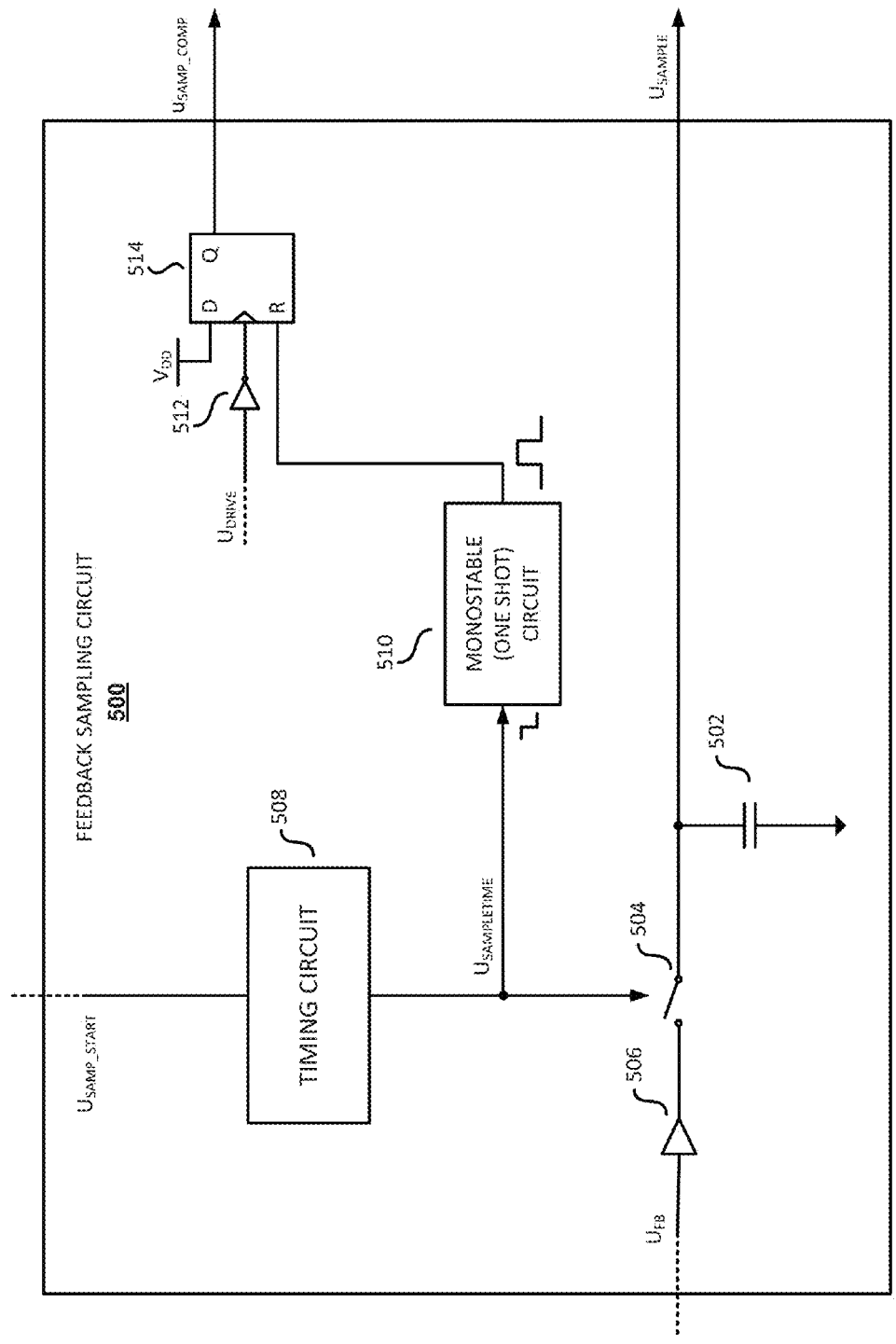
FIG. 5 is a functional block diagram illustrating an example feedback sampling circuit, in accordance with the teachings of the present invention.

FIG. 5 is a functional block diagram illustrating an example feedback sampling circuit 500, in accordance with the teachings of the present invention. Feedback sampling circuit 500 is one possible implementation of feedback sampling circuits 116 and 302 of FIGS. 1 and 3, respectively. The illustrated example of feedback sampling circuit 500 is shown as including a sampling capacitor 502, a switch 504, a buffer 506, a timing circuit 508, a monostable (one-shot) circuit 510, an inverter 512, and a D Flip-Flop 514.

In the illustrated example of FIG. 5, feedback sampling circuit 500 includes a sample and hold circuit 503 that includes sampling capacitor 502, switch 504, and buffer 506. Buffer 506 is coupled to receive the feedback signal $U_{FB}$ and is further coupled to the switch 504. The switch 504 is further coupled to sampling capacitor 502 to control when to sample the value onto sampling capacitor 502. For example, when switch 504 is enabled (i.e., closed), the voltage across sampling capacitor 502 integrates the output of buffer 506 (i.e., the feedback signal $U_{FB}$) over a sample time. Similarly, when switch 504 is disabled (i.e., open) at the end of the sample time, the voltage across capacitor 502 is held. In one embodiment, the value that is held on capacitor 502 is the sample signal $U_{SAMPLE}$.

Feedback sampling circuit may also include a timing circuit 508 to provide the sample time signal $U_{SAMPLETIME}$. In one embodiment, timing circuit 508 generates the sample time signal $U_{SAMPLETIME}$ in response to the sample start signal $U_{SAMP\_START}$. In particular, the sample start signal $U_{SAMP\_START}$ may trigger the beginning of the sampling time. By way of example, timing circuit 508 may include a one-shot to generate the sample time signal $U_{SAMPLETIME}$ that is a pulse of fixed duration that begins in response to the pulsing of the sample start signal $U_{SAMP\_START}$.

Feedback sampling circuit 500 may also generate the sampling complete signal $U_{SAMP\_COMP}$, which is representative of when the sampling is complete. In other words, sampling complete signal $U_{SAMP\_COMP}$ may indicate a time at which switch 504 is opened and that the sampled value is held on capacitor 502. In one embodiment, the feedback sampling circuit 500 generates the sampling complete signal $U_{SAMP\_COMP}$ in response to an end of the sampling time as indicated by the sample time signal $U_{SAMPLE}$. For example, feedback sampling circuit 500 includes D flip-flop 514 that is coupled to be reset on the falling edge of sample time signal $U_{SAMPLETIME}$ by way of monostable circuit 510. In other words, monostable circuit 510 pulses when switch 504 is opened. Thus, the D flip-flop 514 indicates that sampling is complete when Q output of flip-flop 514 transitions to a logic low. The D flip-flop 514 is also coupled to receive the inverse of the drive signal $U_{DRIVE}$ by way of inverter 512, such that the Q output of flip-flop 514 is set each switching cycle when the power switch S1 is turned off.

Figure 6:
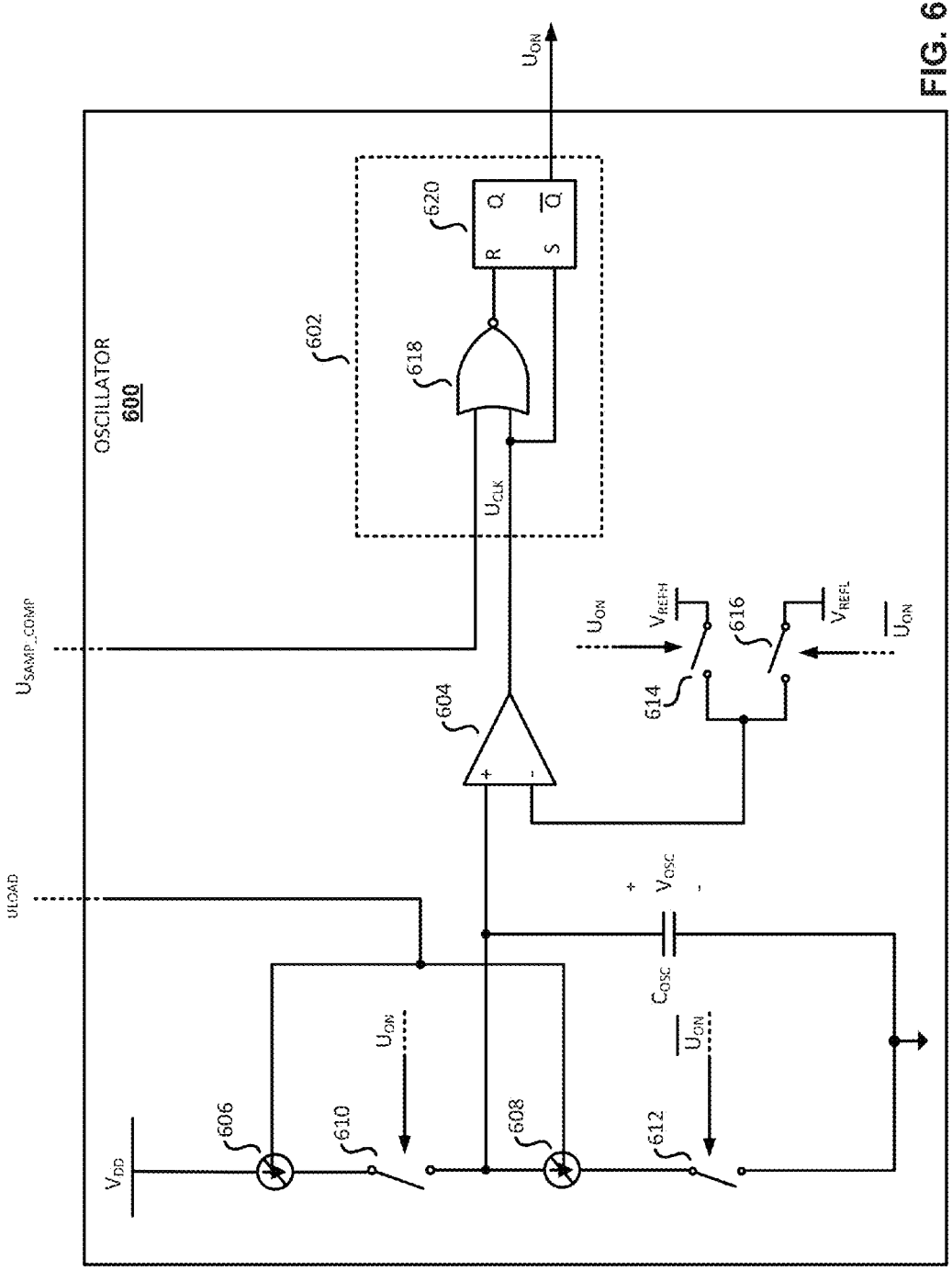
FIG. 6 is a functional block diagram illustrating an oscillator, in accordance with the teachings of the present invention.

FIG. 6 is a functional block diagram illustrating an oscillator 600, in accordance with the teachings of the present invention. Oscillator 600 is one possible implementation of oscillators 118 and 304 of FIGS. 1 and 3, respectively. The illustrated example of oscillator 600 includes a false sampling prevention circuit 602, a comparator 604, variable current sources 606 and 608, an oscillator capacitor $C_{OSC}$ and switches 610, 612, 614, and 616. False sampling prevention circuit 602 is shown as including a logic gate 618 and a latch 620.

In the example of FIG. 6, variable current source 606 is coupled to charge capacitor $C_{OSC}$ when switch 610 is enabled (i.e., closed) and variable current source 608 is coupled to discharge capacitor $C_{OSC}$ when switch 612 is enabled. Comparator 604 is coupled to compare a voltage $V_{OSC}$ across capacitor $C_{OSC}$ with an upper reference voltage $V_{REFH}$ and a lower reference voltage $V_{REFL}$, as determined by switches 614 and 616. In operation, switches 610 and 612 are controlled with the on-time signal $U_{ON}$ to alternately charge and discharge capacitor $C_{OSC}$ to generate clock signal $U_{CLK}$ at the output of comparator 604 such that on-time signal $U_{ON}$ has a switching frequency and corresponding switching period. For example, when the on-time signal $U_{ON}$ is a logic high, switches 610 and 614 are enabled to charge the capacitor while the oscillator voltage $V_{OSC}$ is compared with the upper reference voltage $V_{REFH}$. Continuing with this example, when on-time signal $U_{ON}$ is low (i.e., $\overline{UON}$ is high), switches 612 and 616 are enabled to discharge the capacitor while the oscillator voltage $V_{OSC}$ is compared with the lower reference voltage $V_{REFL}$. In one example, switches 610 and 614 are switched together and switches 612 and 616 are switched together. In another example, when switched 610 and 614 are in a state, switched 612 and 616 an alternate state. For example, when switch 610, and 614 are enabled, switches 612 and 616 are disabled and vice versa.

As shown in FIG. 6, current sources 606 and 608 are variable current sources coupled to receive the load signal $U_{LOAD}$. Thus, the magnitude of the currents provided by current sources 606 and 608 are responsive to a load condition at the output of the power converter 100. In one embodiment, the greater the load condition, the greater the magnitude of current provided by current sources 606 and 608, thereby increasing the frequency of clock signal $U_{CLK}$. In this manner, the oscillator frequency can be set in response to a load signal representative of a load condition at the output of a power converter. Although FIG. 6 illustrates current sources 606 and 608 as variable current sources, one or more of the current sources 606 and 608 may be fixed current sources providing a fixed current to charge and/or discharge capacitor $C_{OSC}$.

FIG. 6 further illustrates false sampling prevention circuit 602 coupled to receive the sampling complete signal $U_{SAMP\_COMP}$ and the clock signal $U_{CLK}$. Latch 620 is coupled to generate the on-time signal $U_{ON}$. As mentioned above, the on-time signal $U_{ON}$ determines the on time of the power switch and is used to set frequency of drive signal $U_{DRIVE}$. In other words, on-time signal $U_{ON}$ may indicate to the drive logic when to end the off-time $T_{OFF}$ of power switch S1 to end each switching period.

In the embodiment of FIG. 6, latch 620 provides the on-time signal via the $\overline{Q}$ output of latch 620. Thus, latch 620 asserts the on-time signal $U_{ON}$ to turn on power switch S1 and thus end the off-time when latch 620 is reset. However, false sampling prevention circuit 602 further includes logic gate 618 coupled to extend the off-time of the power switch S1 until the sample complete signal $U_{SAMP\_COMP}$ indicates that sampling by the feedback sampling circuit (e.g., feedback sampling circuit 302 of FIG. 3) is complete. In particular, logic gate 618 resets latch 620 only if both the oscillator $V_{OSC}$ is discharged to the lower reference voltage $V_{REFL}$ (to maintain desired frequency) and sampling of the bias winding voltage $V_{BIAS}$ is complete. If the sampling is not complete when the oscillator voltage $V_{OSC}$ reaches the lower reference voltage $V_{REFL}$, logic gate 618 prevents latch 620 from resetting, thereby extending the off-time of the power switch S1 until sampling complete signal $U_{SAMP\_COMP}$ indicates that sampling is indeed complete. By extending the off-time of the switching period to prevent a false sampling (e.g., preventing sampling during the on-time), the period of the switching cycle may be extended, which may temporarily adjust the switching frequency. According to the teaching of the present invention, a power converter may maintain better regulation if the switching frequency is temporarily extended instead of a acquiring false sample.

Figure 7A:
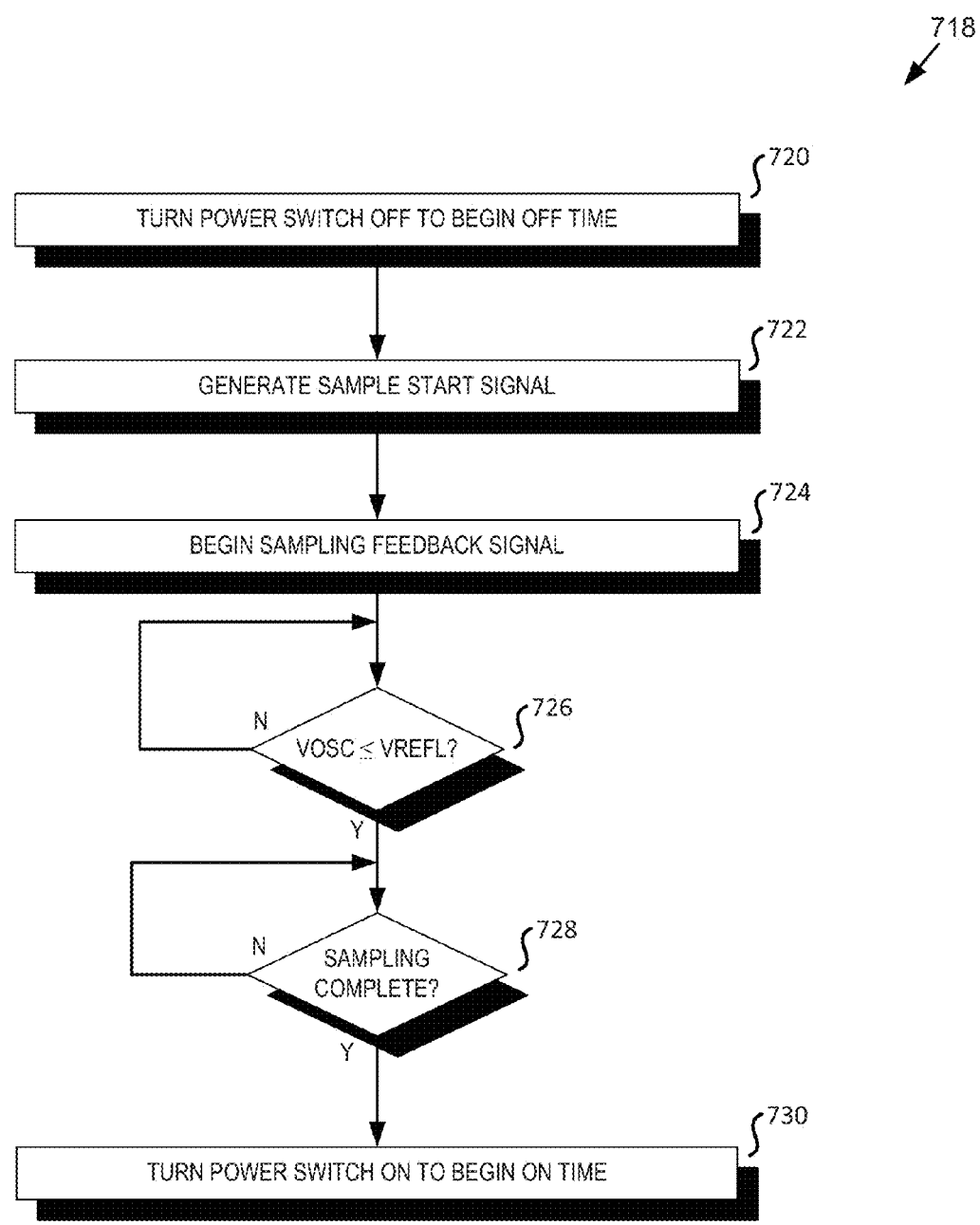
FIG. 7A illustrates an example process for on time sampling prevention by a power converter controller, in accordance with the teachings of the present invention.
Figure 7B:
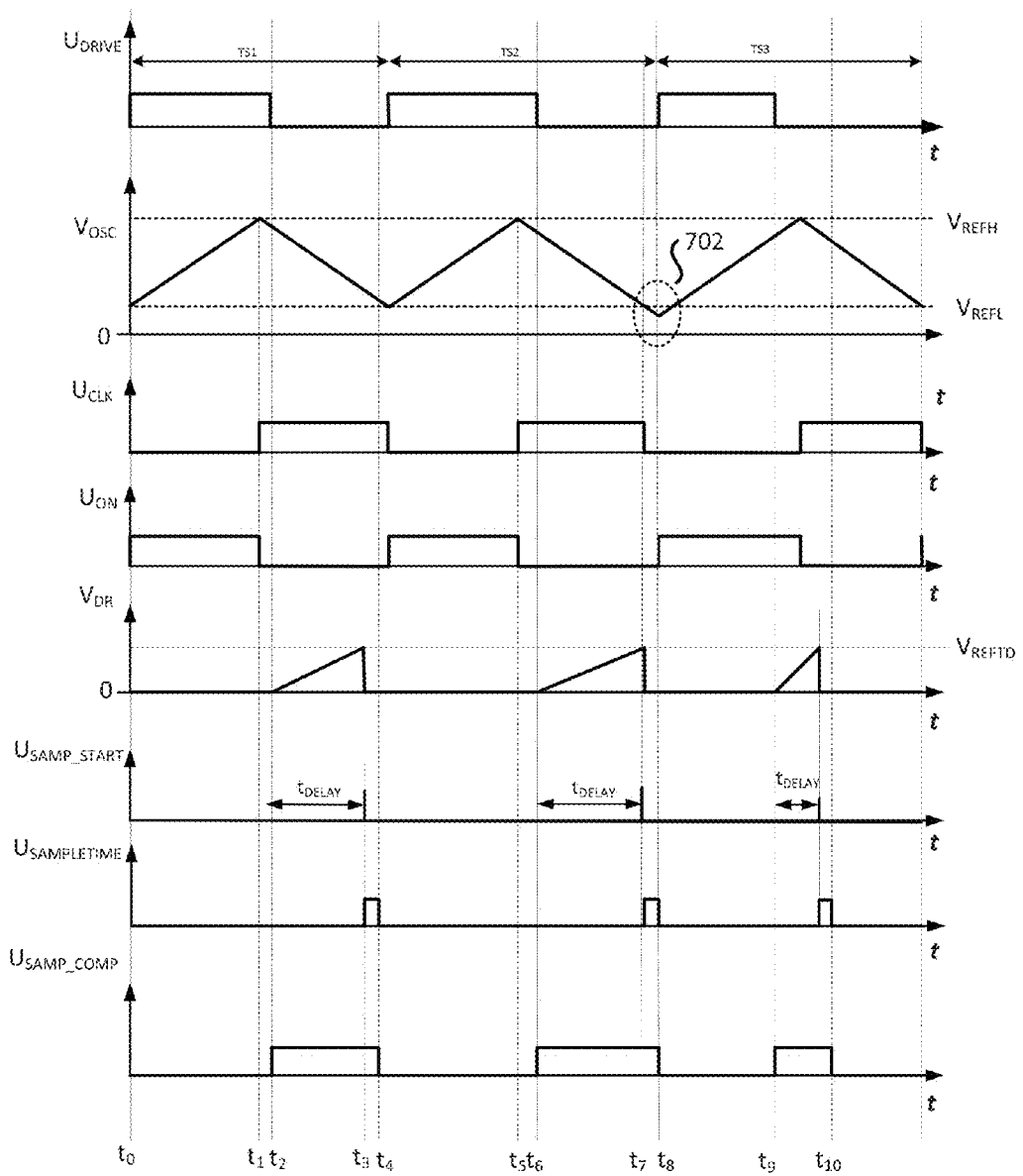
FIG. 7B illustrates example voltage and current waveforms and clock signals associated with an example power converter controller, in accordance with the teachings of the present invention.

FIG. 7A illustrates an example process 718 for preventing false samplings by a power converter controller, in accordance with the teachings of the present invention. FIG. 7B illustrates example voltage and current waveforms and clock signals associated with an example power converter controller, in accordance with the teachings of the present invention. The operation of controller 300 will now be described in further detail with reference to FIGS. 3-7B.

Referring to FIG. 7A, process 718 includes a process block 720 where power switch S1 is turned off to begin the off time. As shown in FIG. 7B, the off time begins at time t2 with drive signal $U_{DRIVE}$ transitioning to a logic low. The transitioning of the drive signal $U_{DRIVE}$ to a logic low triggers the charging of capacitor 408 of the sample delay circuit 400 to begin the time delay $t_{DELAY}$. At time t3 (i.e., the end of the time delay $t_{DELAY}$), sample delay circuit 400 asserts the sample start signal $U_{SAMP\_START}$. Also at time t3, in response to the sample start signal $U_{SAMP\_START}$, feedback sampling circuit 500 begins sampling the feedback signal $U_{FB}$ by closing switch 504 (i.e., process block 724). When sampling is complete, feedback sampling circuit 500 transitions the sampling complete signal $U_{SAMP\_COMP}$ to a logic low. In a decision block 726, comparator 604 of oscillator 600 determines whether the oscillator voltage $V_{OSC}$ has reached the lower reference voltage $V_{REFL}$. As shown in FIG. 7A, oscillator voltage $V_{OSC}$ reaches the lower reference voltage $V_{REFL}$ at time t4. In a decision block 728, false sampling prevention circuit 602 determines that sampling has been completed (as indicated by the sampling complete signal $U_{SAMP\_COMP}$ being in a logic low state at time t4). In a process block 730, false sampling prevention circuit 602 then asserts the on-time signal $U_{ON}$ to turn on power switch S1 and thus end the off-time (i.e., begin the on-time).

Continuing with the voltage waveforms of FIG. 7B, in a subsequent switching period $T_{P2}$, at time t7, the oscillator voltage $V_{OSC}$ has again reached the lower reference voltage $V_{REFL}$. However, sampling of the feedback signal $U_{FB}$ by feedback sampling circuit 500 is not yet complete at time t7. Thus, false sampling prevention circuit 602 does not assert the on-time signal $U_{ON}$ at time t7 thereby keeping the power switch S1 disabled (i.e., off). At time t8, sampling is complete as indicated by the sample complete signal $U_{SAMP\_COMP}$ transitioning to a logic low. Thus, false sampling prevention circuit 602 extends the switching period by a time $t_{EXTOFF}$ of the on-time signal to keep the power switch S1 off until time t8.

Figure 9:
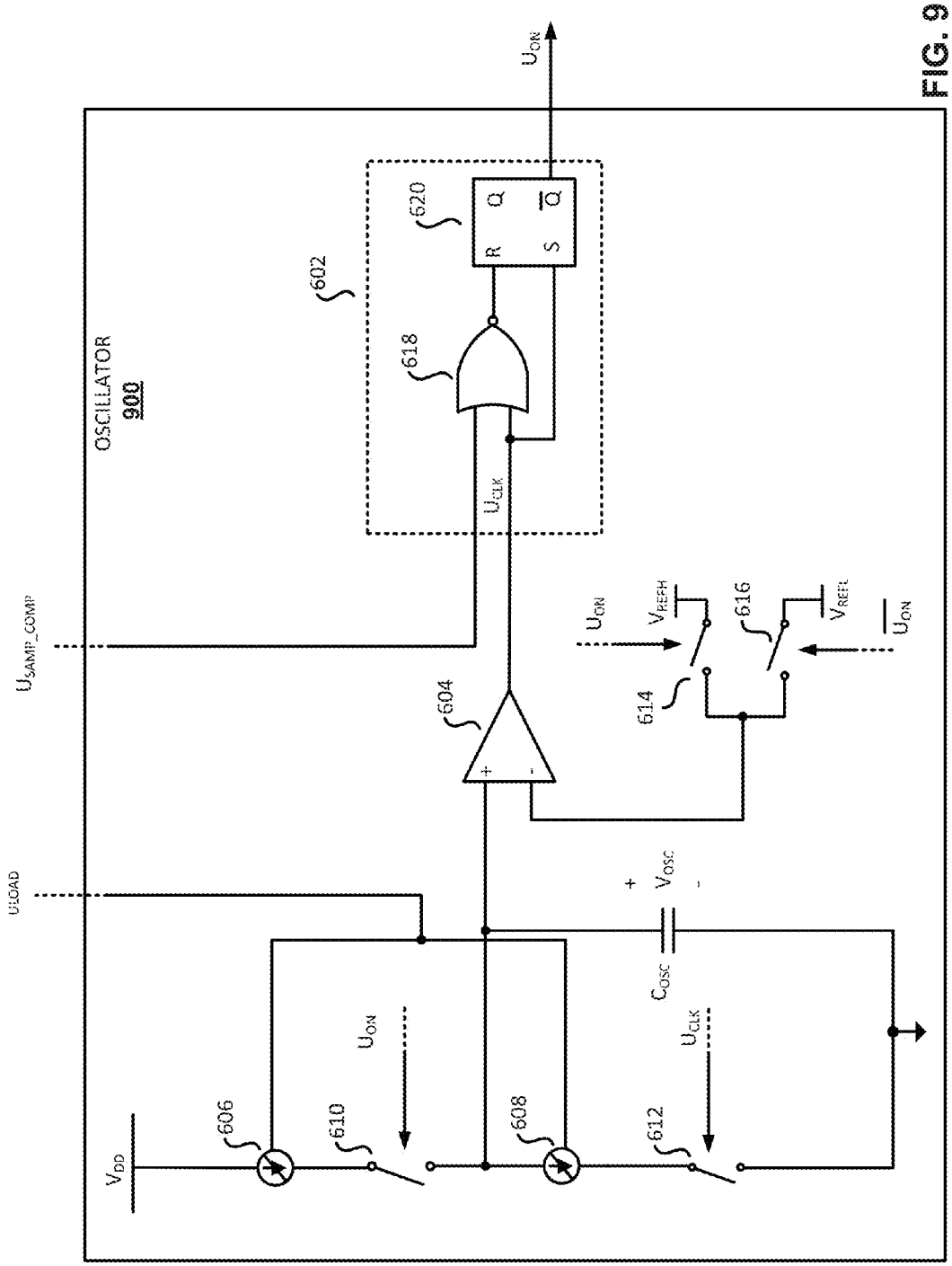
FIG. 9 is a functional block diagram illustrating another example oscillator, in accordance with the teachings of the present invention.
Figure 10:
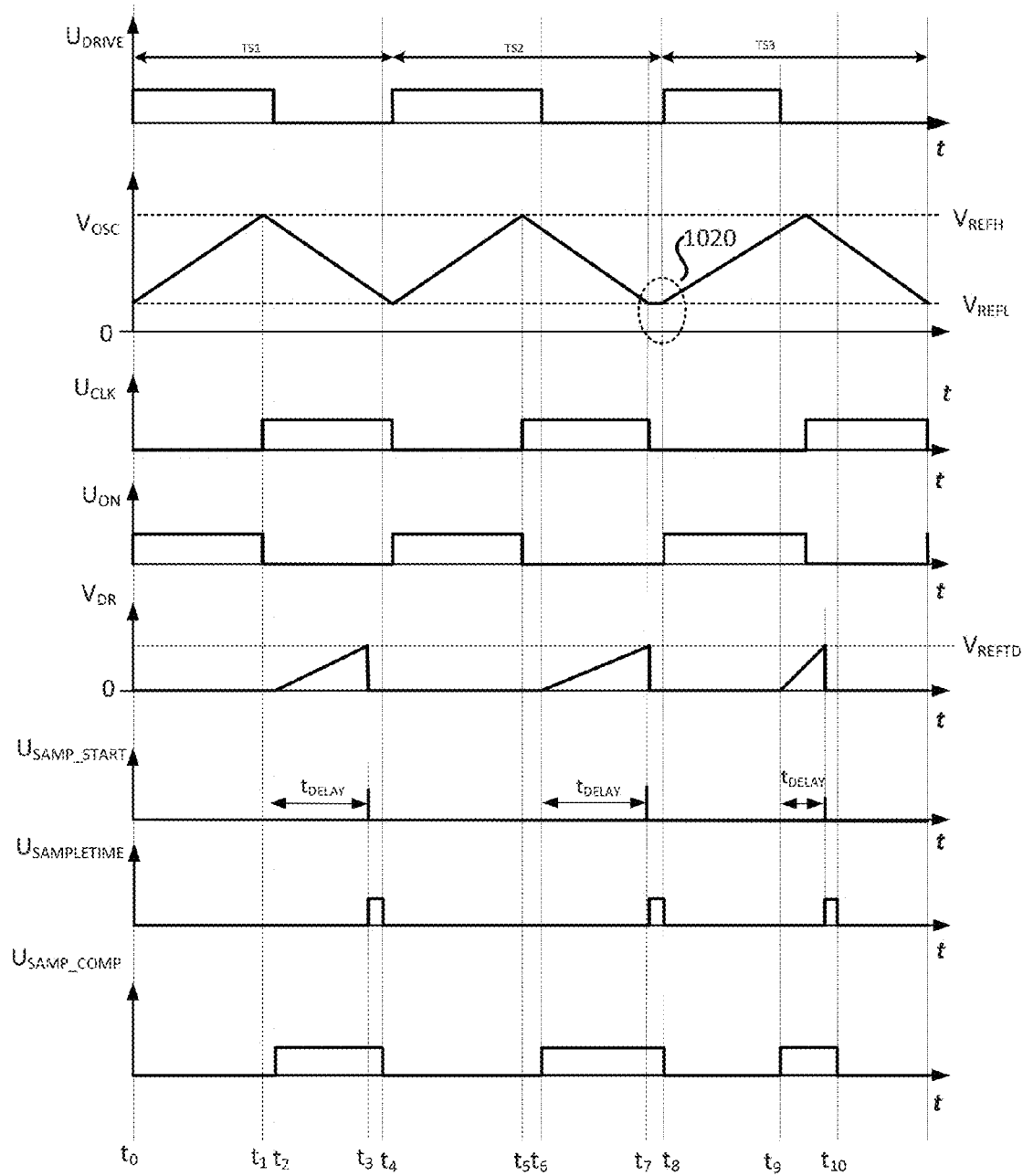
FIG. 10 illustrates example voltage and current waveforms and clock signals associated with another example power converter controller, in accordance with the teachings of the present invention.

As mentioned above, with reference to oscillator 600, the on-time signal $U_{ON}$ may be used to control switches 610 and 612 to determine the times at which capacitor $C_{OSC}$ is charged and discharged. As can be seen from portion 702 of FIG. 7B, extending the switching period by delaying the on-time signal $U_{ON}$ causes the capacitor $C_{OSC}$ to discharge to below the lower reference voltage $V_{REFL}$. FIG. 8 illustrates an exploded view of portion 712 As can be seen from FIG. 8, the switching period of the on-time signal $U_{ON}$ and, thus, the off-time of power switch S1 are extended by an off-time extension $T_{EXTOFF}$. In addition, because the oscillator voltage $V_{OSC}$ discharges to below the lower reference voltage $V_{REFL}$, the subsequent switching period is also extended by a subsequent extension time $T_{EXTSUB}$. In one embodiment, the off-time extension $t_{EXTOFF}$ is substantially equal to the subsequent extension time $T_{EXTSUB}$. FIG. 9 is a functional block diagram illustrating another example oscillator 900, in accordance with the teachings of the present invention. Oscillator 900 is one possible implementation of oscillators 118 and 304 of FIGS. 1 and 3, respectively. Oscillator 900 is similar to oscillator 600 of FIG. 6, where like numerals have been used to refer to like objects. However, unlike the oscillator of FIG. 6, oscillator 900 utilizes separate signals for controlling switches 610 and 612. In particular, switch 610 is controlled in response to the on-time signal $U_{ON}$, while switch 612 is controlled in response to the clock signal $U_{CLK}$. As shown in FIG. 10, using the clock signal $U_{CLK}$ to control the discharging of capacitor $C_{OSC}$ allows the oscillator voltage $V_{OSC}$ to be held at the lower reference voltage $V_{REFL}$ until the sampling complete signal $U_{SAMP\text{-}COMP}$ indicates that sampling is complete. To be sure, at time t7, the oscillator voltage $V_{OSC}$ has reached the lower reference voltage $V_{REFL}$. However, sampling of the feedback signal $U_{FB}$ by feedback sampling circuit 500 is not yet complete at time t7. Thus, false sampling prevention circuit does not assert the on-time signal $U_{ON}$ at time t7 thereby keeping the power switch S1 disabled (i.e., off). However, at time t7, when the lower reference voltage $V_{REFL}$ is reached, the output comparator 604 of oscillator 900 (i.e., clock signal $U_{CLK}$) transitions to a logic low thereby opening switch 612. The opening of switch 612 at time t7 prevents the further discharging of capacitor $C_{OSC}$ and holds the lower reference voltage $V_{REFL}$ on the capacitor. At time t8, sampling is complete as indicated by the sample complete signal $U_{SAMP\_COMP}$ transitioning to a logic low, thus enabling switch 610 to begin the next period by charging capacitor $C_{OSC}$. Accordingly, false sampling prevention circuit 602 of oscillator 900 extends the switching period of the on-time signal to keep the power switch S1 off until time t8.

Figure 11:
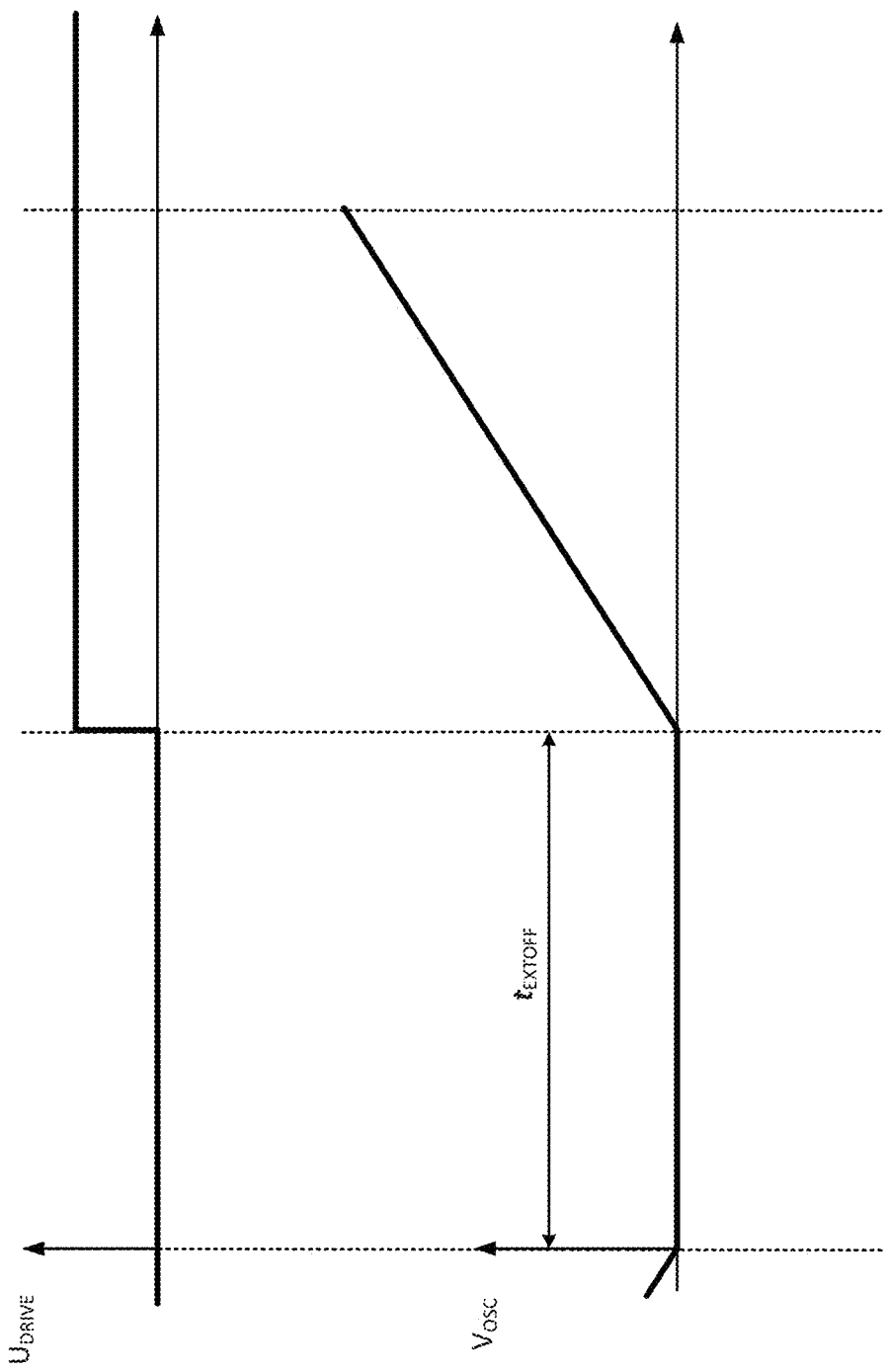
FIG. 11 illustrates an exploded view of the oscillator voltage and sampling complete signal waveforms of FIG. 10.

FIG. 11 illustrates an exploded view of the portion 1020 of the oscillator voltage of FIG. 10. As can be seen from FIG. 11, the switching period of the on-time signal $U_{ON}$ and, thus, the off-time of power switch S1 are extended by an off-time extension $T_{EXTOFF}$. In addition, because the oscillator voltage $V_{OSC}$ is held at the lower reference voltage $V_{REFL}$, the subsequent switching period is not extended as in the case in the embodiment of FIG. 6. In this embodiment, the switching period of only once switching cycle is affected.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller circuit for use in a power converter having a switch, the controller circuit comprising:
    a feedback sampling circuit coupled to generate a sample signal in response to a sampling of a feedback signal that is representative of an output of the power converter;
    an oscillator coupled to generate a periodic on-time signal that transitions from a first logic state to a second logic state;
    a drive logic to be coupled to control switching of the switch to regulate the output of the power converter in response to the sample signal and in response to the on-time signal, wherein the drive logic is configured to turn on the switch in response to the on-time signal transitioning from the first logic state to the second logic state; and
    a false sampling prevention circuit coupled to receive a sampling complete signal and coupled to the oscillator to prevent the on-time signal from transitioning from the first logic state to the second logic state until the sampling complete signal indicates that the sampling of the feedback signal is complete.

2. The controller circuit of claim 1, wherein the oscillator includes:
    a capacitor; and
    first and second current sources coupled to alternately charge and discharge the capacitor between an upper and lower reference voltage, respectively, to generate the on-time signal, wherein the drive logic is coupled to turn on the power switch in response to the capacitor discharging to the lower reference voltage if the sampling complete signal indicates that the sampling of the feedback signal is complete.

3. The controller circuit of claim 2, wherein the second current source is coupled to discharge the capacitor to below the lower reference voltage if the sampling complete signal does not indicate that sampling is complete when the lower reference voltage is reached.

4. The controller circuit of claim 3, wherein the second current source is coupled to continue the discharging of the capacitor to below the lower reference voltage until the sampling complete signal indicates that sampling is complete.

5. The controller circuit of claim 2, wherein a voltage on the capacitor is held at the lower reference voltage if the sampling complete signal does not indicate that sampling is complete when the lower reference voltage is reached.

6. The controller circuit of claim 5, wherein the voltage on the capacitor is held at the lower reference voltage until the sampling complete signal indicates that sampling is complete.

7. The controller circuit of claim 1, wherein the switch is included in the controller circuit.

8. A switch mode power converter, comprising:
    an energy transfer element coupled between an input and an output of the power converter;
    a switch coupled to control a transfer of energy through the energy transfer element;
    a control circuit coupled to the switch, the control circuit including:
        a sample and hold circuit configured to sample a feedback signal representative of the output of the power converter and to hold the sampled feedback signal;
        an oscillator coupled to receive a sampling complete signal and coupled to generate a periodic on-time signal that transitions from a first logic state to a second logic state, and wherein the oscillator is configured to prevent the on-time signal from transitioning from the first logic state to the second logic state until the sampling complete signal indicates that the sampling of the feedback signal is complete; and a drive logic coupled to control switching of the switch to regulate the output of the power converter in response to the sampled feedback signal and in response to the on-time signal, wherein the drive logic is further coupled to turn on the switch in response to the on-time signal transitioning from the first logic state to the second logic state.

9. The power converter of claim 8, wherein the oscillator further includes:

a capacitor; and first and second current sources coupled to alternately charge and discharge the capacitor between an upper and lower reference voltage, respectively, to generate the on-time signal, wherein the drive logic is coupled to turn on the power switch in response to the capacitor discharging to the lower reference voltage if the sampling complete signal indicates that the sampling of the feedback signal is complete.

10. The power converter of claim 9, wherein the second current source is coupled to discharge the capacitor to below the lower reference voltage if the sampling complete signal does not indicate that sampling is complete when the lower reference voltage is reached.

11. The power converter of claim 10, wherein the second current source is coupled to continue the discharging of the capacitor to below the lower reference voltage until the sampling complete signal indicates that sampling is complete.

12. The power converter of claim 9, wherein a voltage on the capacitor is held at the lower reference voltage if the sampling complete signal does not indicate that sampling is complete when the lower reference voltage is reached.

13. The power converter of claim 12, wherein the voltage on the capacitor is held at the lower reference voltage until the sampling complete signal indicates that sampling is complete.

14. The power converter of claim 8, wherein the control circuit and the switch are included in an integrated circuit.

* * * * *